(12) United States Patent
Spector

(10) Patent No.: US 6,227,863 B1
(45) Date of Patent: May 8, 2001

(54) PHONICS TRAINING COMPUTER SYSTEM FOR TEACHING SPELLING AND READING

(76) Inventor: Donald Spector, 380 Mountain Rd., Union City, NJ (US) 07080

( * ) Notice: Subject to any disclaimer, the term of this patent is extended or adjusted under 35 U.S.C. 154(b) by 0 days.

(21) Appl. No.: 09/025,347

(22) Filed: Feb. 18, 1998

(51) Int. Cl.[7] .................................................. G09B 1/00
(52) U.S. Cl. ........................ 434/167; 434/156; 434/169
(58) Field of Search .................... 434/156, 167, 434/169

(56) References Cited

U.S. PATENT DOCUMENTS

| | | | | |
|---|---|---|---|---|
| 1,273,763 | * | 7/1918 | Garman | 434/345 |
| 1,394,620 | * | 10/1921 | Haupt | 434/167 |
| 3,491,196 | * | 1/1970 | Stein | 434/345 |
| 4,688,192 | * | 8/1987 | Yoshimura et al. | 704/10 |
| 4,698,758 | * | 10/1987 | Larsen | 707/535 |
| 5,302,132 | * | 4/1994 | Corder | 434/156 |
| 5,306,153 | * | 4/1994 | Foster | 434/170 |
| 5,429,513 | * | 7/1995 | Diaz-Plaza | 434/167 |
| 5,451,163 | * | 9/1995 | Black | 434/178 |
| 5,511,980 | * | 4/1996 | Wood | 434/169 |
| 5,741,136 | * | 4/1998 | Kirksey et al. | 434/169 |
| 5,799,279 | * | 8/1998 | Gould et al. | 704/275 |

* cited by examiner

*Primary Examiner*—Jacob K. Ackun, Jr.
*Assistant Examiner*—Kurt Fernstrom

(57) ABSTRACT

A phonics training system adapted to teach a pre-school child having a limited vocabulary of words which identify various objects, such as people, animals and things, how each of these words is spelled, thereby making it possible for the child to read these words. The system includes a computer having a video output terminal and a memory in which is digitally stored an electronic dictionary containing the phonetic sounds of the words in the vocabulary and the alphabetic spelling of each of these words. Associated with the computer is image software containing a library of images which illustrate the various objects represented by the words in the phonetics dictionary. The computer is provided with a peripheral in the form of a voice recognition unit into which the child speaks, the unit acting to recognize the distinctive sound pattern of the child's voice and to accommodate the phonetics dictionary to this pattern.

5 Claims, 1 Drawing Sheet

PHONICS TRAINING COMPUTER SYSTEM FOR TEACHING SPELLING AND READING

BACKGROUND OF THE INVENTION

1. Field of Invention

This invention relates generally to an electronic dictionary having digitally stored therein the phonetic sounds of each word in a vocabulary limited to words known to pre-school children, as well as the letters of the alphabet which spell each of these words, and more particularly to a phonics training computer system that includes an electronic dictionary of this type and is adapted to teach pre-school children how to spell and read the words therein.

2. Status of Prior Art

A child cannot read a printed text until he learns how the words which make up the text are spelled. It is only when a reader recognizes a word from the way it is spelled that he can read it. Hence spelling is a prerequisite to reading.

A child usually first learns to spell and read after he enters an elementary school. However, it is advantageous to have a pre-school child, three to five years of age, learn at home to spell and read the words included in his then limited vocabulary. In his pre-school years, a typical child mainly knows words which name objects, such as people, animals and things that he has actually seen. Thus the pre-school child has in his vocabulary the words: boy, girl, man, cat, dog, bottle, house, orange and apple, but not transistor, scalpel or generator.

Should a child in his pre-school years be able to spell and read the simple words in his limited vocabulary before entering an elementary school, this ability significantly reduces the shock experienced by the typical child when given in school his first book to read. A child who before entering an elementary school become familiar with the alphabet and how the letters of the alphabet form words, is in a far better condition to cope with the early stresses of an elementary school away from home than a child whose very first exposure to the alphabet is after entering this school.

Phonics is a method of teaching children elementary reading and spelling based on the sounds (phonetics) of ordinary words. The drawback of conventional phonics, as applied to the English language is that the sounds of syllables which make up words have no consistent spelling. Thus a word with a K sound may be spelled with a C, while a words with an F sound, with a PH.

As noted in the Wood patent U.S. Pat. No. 5,511,98 (1996) children learn letters and the names of various objects by audible repetition accompanied by visualization of the object. Wood discloses a learning device in the form of an open book for pre-school children in which the book has three-dimensional letters of the alphabet received by a card that spells a word.

In the Wood learning device, the card is placed in the book. Then a speech processor circuit recites a word written in the book and sounds the phonics associated with each phoneme in the word when the child places the correct alphabet letters in the card and repeats the entire word.

Of prior art interest is the electronic dictionary disclosed in the 1989 Hashimoto patent U.S. Pat. No. 4,774,596. In a phonics training computer system in accordance with the invention, the system includes an electronic dictionary in which digitally stored therein are the phonetic sounds of each word in a limited vocabulary of words as well as the letters which spell each listed word.

Of particular prior art interest is the software being currently marketed by Dragon Systems, Inc. identified as "Dragon, Naturally Speaking". This software, when used with a standard computer or PC having an output video terminal, makes it possible for its user to speak into a voice recognition unit associated with a computer which is adapted to recognize the voice of the speaker and to process the words spoken by the user so that these words appear on the screen of the terminal properly spelled.

The Dragon system includes in its memory a vocabulary of 30,000 active words with spelling, pronunciation, context recognition and word usage information. "Dragon, Naturally Speaking" is a basic word processor that learns and recognizes the voice of the speaker and can learn dialects, accents and individual pronunciations quickly and automatically. Thus an adult user can dictate into a Dragon word processor and at the same time see the words he is speaking on the screen, properly spelled.

In order to teach a pre-school child to spell and read, one must take into account that the vocabulary of this child is of limited scope, being made up largely of simple words identifying objects familiar to the child, such as boy, man, rock, spoon, book, chair and house. No need exists therefore, as in the Dragon word processor, for a computer memory having a vocabulary comparable in size to that of a standard dictionary. While a Dragon word processor is useable by a pre-school child, it fails to factor in the natural learning process by which a pre-school child learns to spell and read.

Essential to this process is both aural and visual association. When a child speaks a word, it is necessary for teaching purposes that he then see what this word alone looks like in alphabetic terms. Thus when a child says the word CAT, he should then see on a screen only the letters CAT, and he should concurrently see on the screen what a cat looks like.

Thus when a child speaks the word CAT, these sounds should summon up the letters which spell this word and a picture of a cat. In the way, the sounds of the word are associated in the child's mind with the spelling of the word and an image of the object identified by the word. The interrelated aural and visual associations serve to effectively engrave in the mind of the child both the spelling of the word and its meaning, thereby making it possible for the child not only to read the word when the spelled word appears in a book but to fully understand its meaning.

SUMMARY OF INVENTION

In view of the foregoing, the main object of this invention is to provide a phonics training computer system adapted to teach a pre-school child having a limited vocabulary of words to spell and read these words.

It is to be understood that while a system in accordance with the invention, as disclosed herein, is intended for pre-school children, the system may be arranged to teach school age children to read, in which case the electronic dictionary included in the computer is enlarged to encompass the vocabulary of an older child.

Also an object of the invention is to provide a system of the above type in which the sounds which express a word are visually associated not only with the letters that spell the word but also with an image of the object identified by the word, thereby impressing the word, spelling and its meaning in the mind of the child using the system.

Yet another object of the invention is to provide a system of the above type which is capable of teaching a child to spell arithmetic numbers.

A significant feature of a teaching system in accordance with the invention is that it is relatively inexpensive to assemble, for it makes use of a commercially available computer having an output video terminal and software dedicated to the subject matter being taught.

Briefly stated, these objects are attained by a phonics training system adapted to teach a pre-school child having a limited vocabulary of words that identify various objects, such as people, animals and things, how each of these words is spelled, thereby making it possible for the child to read these words. The system includes a computer having a video output terminal and a memory in which is digitally stored an electronic dictionary containing the phonetic sounds of the words in the limited vocabulary and the alphabetic spelling of each of these words. Associated with the computer is image software containing a library of images which illustrate the various objects represented by the words in the phonetics dictionary.

The computer is provided with a peripheral in the form of a voice recognition unit into which the child speaks, the unit acting to recognize the distinctive sound pattern of the child's voice and to accommodate the phonetics dictionary to this pattern.

In operation, when a child speaks into the unit a word identifying a particular object, the sounds of the spoken word are digitized and the computer then acts to scan the digitized phonetics dictionary to find the corresponding word. The computer then presents on the screen of the video terminal the letters which spell this word as well as an image of the object representing this word. Thus when a child speaks a particular word into the unit, he then sees how this word is spelled and what the object identified by the word looks like.

BRIEF DESCRIPTION OF DRAWING

For a better understanding of the invention as well as other objects and further features thereof, reference is made to the following detailed description to be read in conjunction with the accompanying drawings, wherein.

DESCRIPTION OF INVENTION

Figure 1:
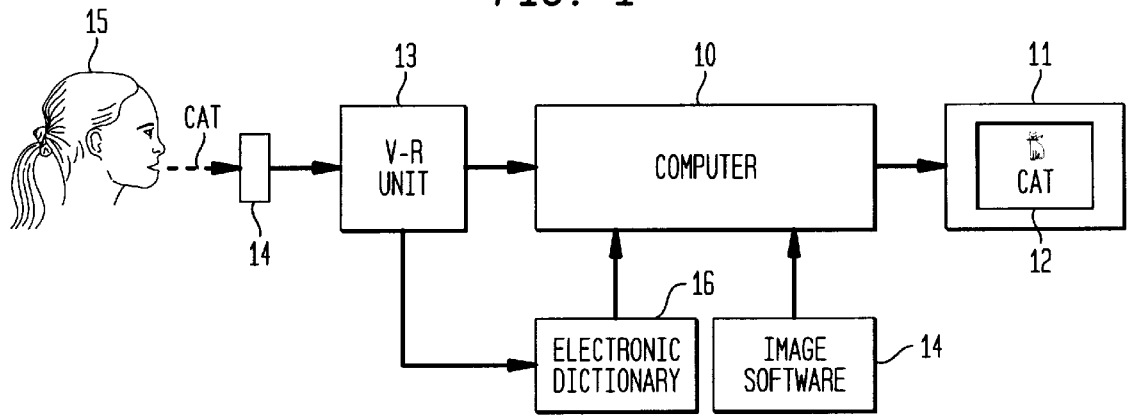
FIG. 1 is a block diagram of a first preferred embodiment of a teaching system in accordance with the invention.

First Embodiment:

Referring now to FIG. 1 illustrated therein is a phonics training system in accordance with the invention that includes a digital computer 10 having a central processing unit (CPU). The output of computer 10 is coupled to a video monitor or terminal 11 having a screen 12 on which is presented the letters of the alphabet which spell a word spoken into the system by a pre-school child, and also an image of the object identified by this word.

In the input of computer 10 is a peripheral in the form of a voice recognition unit 13 coupled to a microphone 14. When a pre-school child 15 (or other speaker) speaks into microphone 15, unit 13 then recognizes the distinctive pattern of sounds in the voice of the child, and converts these sounds into digitized signals that are fed into computer 10 and processed therein.

Associated with computer 10 is an electronic phonetics dictionary 16 similar to that in the Dragon, Naturally Speaking system referred to above, except that its vocabulary is much smaller, being limited to words known to a typical pre-school child. Digitally stored in the electronic phonetics dictionary are both the phonetic sounds which constitute the words contained in the dictionary and the alphabetic letters which spell each word. The contents of this dictionary are downloaded into the memory of the computer.

The voice recognition unit 13 is operatively coupled to the electronic phonetics dictionary so as to condition this dictionary to render it responsive to the distinctive voice pattern of the child using the system. Thus which the phonetic sounds of the words digitally stored in the electronic dictionary are synthetically generated sounds, not sounds derived form a human voice, the dictionary must be able to compare a word spoken by pre-school child with the same word stored in the dictionary. In order to be able to do so, before the child uses the system to spell words, he first speaks for a few minutes into the voice recognition unit to permit the unit to analyze the voice of the child and then recognize its unique pattern.

We shall assume the electronic dictionary has digitally stored therein a vocabulary of one thousand simple words and also the letters of the alphabet which spell each word. When a child speaks into the input of the computer the word CAT, then the computer scans the words in the dictionary to find the stored digitized sounds which correspond to the digitized sounds of the word CAT yielded by voice recognition unit 13.

Figure 2:
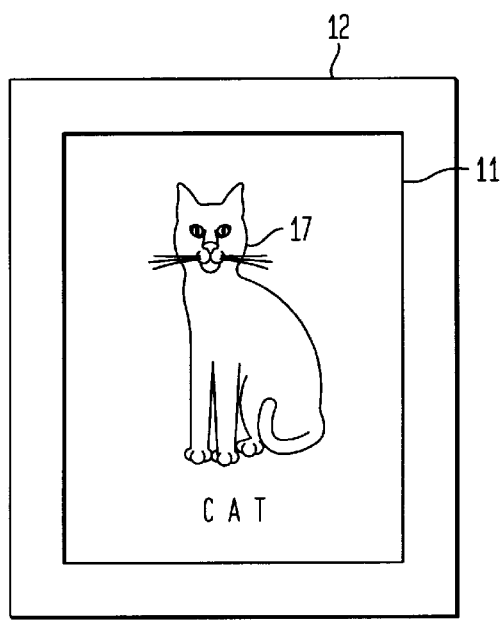
FIG. 2 illustrates the screen of the computer terminal on which appear the letters spelling the word CAT and an image of a cat.

When a match is found by the computer, then the letters of the word CAT yielded in the output of the computer are presented on screen 12 of computer terminal 11, as shown in FIG. 2. Hence the child sees how the word he has just spoken into the computer is spelled.

Also associated with computer 10 is image software S having stored therein a library of digitized images, each being a picture or drawing of an object identified by a respective word included in the vocabulary of the electronic dictionary. Thus if the dictionary contains the words DOG, CAT, BOY, HOUSE and BOTTLE, in the image library there will be a picture or drawing of each of these objects.

When computer 10 responds to an incoming word, such as CAT, and presents on screen 12 the spelling of CAT, it at the same time presents on the screen an image 17 of a cat, as shown in FIG. 2.

Thus whatever word is spoken into the input of the computer by a child using the system which identifies an object, this causes the computer to yield in its output terminal the letters spelling this word and an image of the object identified thereby.

In this way a pre-school child using the system is taught how to spell the words which are included in his limited vocabulary while seeing for each word an image of the object represented by the word. This serves not only to impress on the child's mind the spelling of the word, but also serves to clarify its meaning. Thus if a pre-school child is confused as to the distinction between the words BOY an BOOK, when he says the word BOOK and then sees a book on the screen, he knows that a book is not a boy.

In practice, the system need not be confined to words that are nouns and identify objects, for the system can include verbs and adjectives commonly used by pre-school children, such as RUN, JUMP, BIG and LITTLE. In order to illustrate these verbs and adjectives, the image software S must include appropriate illustrations. Thus RUN can be illustrated by a child running, BIG by a giant and SMALL by a midget.

One may use as images cartoon characters that most children are familiar with, having seen them on TV shows for children. Thus PLUTO, the Disney character can be used to represent a dog, and Donald Duck to represent a duck.

It is also useful for teaching pre-school children to spell and read, to include arithmetic numbers such as the digits one to ten, and how these digits are spelled. When children learn how numbers are spelled, they can read stories that refer to "three bears" or "five chairs."

Figure 3:
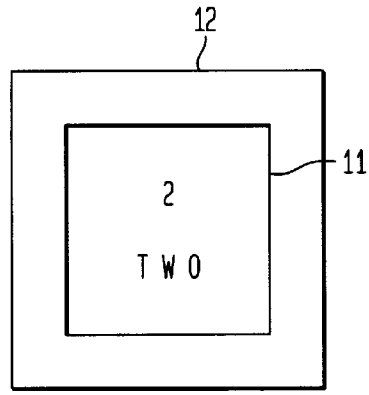
FIG. 3 illustrates the same screen on which appear the letters of the word TWO and an image of the digit representing this number.

To this end, the electronic dictionary 16 can have digitally stored therein the phonetic sounds of the numbers one to ten, and also store the spelling of these numbers. If therefore, as shown in FIG. 3, the child speaks the number 2 into the system, he then sees on screen 12 the spelling of TWO and the character representing this number.

In the learning process, it is desirable when a child is shown how to spell a word, that he then be required to spell the word aloud, for in doing so one then knows whether the child has learned the spelling.

The system may be modified to test the pre-school child to determine whether he remembers how a word is spelled. Thus after a child sees how the word CAT is spelled on screen 12, he is then required to speak into the microphone how this word is spelled by saying the letter C, then the letter A and finally the letter T.

The system for this purpose includes a second electronic dictionary (not shown) which gives the phonetic sounds of the letters which make up the words in dictionary 16. And if the system finds a match between the way the child spells the word CAT and the phonetic sounds of these alphabet letters in the second dictionary, then a check mark appears on the screen to indicate that the child is correct. But if no match is found, then an X mark appears, requiring the child to again speak the word CAT into the system to see how it is correctly spelled and to then retake the test.

Second Embodiment:

In the teaching system shown in FIG. 1, a child sees on the screen of the computer terminal the spelling of the word he has spoken into the computer and an image of the object identified by this word.

But the system depends on the ability of the child to speak into the computer the many words he knows, yet there is nothing to spur the child to speak words he uses infrequently. Thus it may not occur to the child to speak the word BEAR or COW, for he rarely has occasion to use these words even though he knows them.

Figure 4:
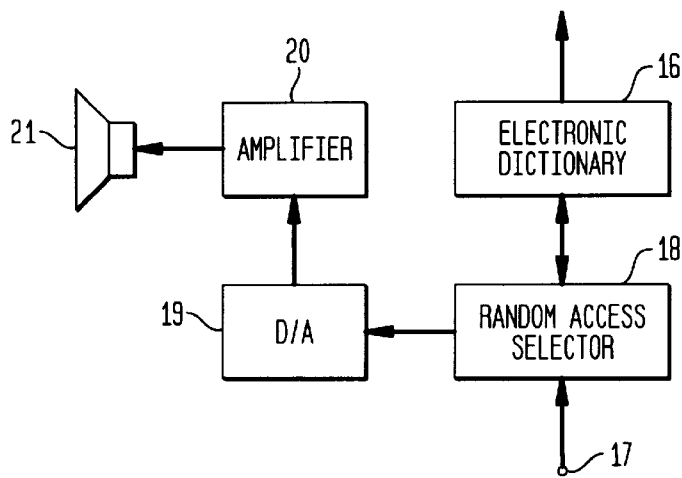
FIG. 4 in a block diagram of a modified system in which the child using the system selects from the computer the sounds of a word stored therein, which he then speaks into the input of the computer in order to see how this word is spelled.

In order therefore for the child to exploit all of the words phonetically stored in the electronic dictionary 11, in the embodiment shown in FIG. 4, associated with this dictionary is a random access selector 18 operated by a button 19 actuated by the child using the system.

When the child presses button 19, selector 18 then chooses at random the stored digitized sounds of one of the words in the dictionary, say BEAR and feeds these sounds to an analog-to-digital converter D/A. The converter yields an analog signal of BEAR. This signal is amplified in analog amplifier 20 and then reproduced by loud speaker 21.

Thus each time the child presses button 19, he hears a word randomly selected from the phonics dictionary. Because the child does not know what word to expect, this lends interest to this operation. The child must then speak the word he has just heard into the computer input, so that he can now see how it is spelled and what object it identifies.

Thus the child may not have in his working vocabulary the word BOAT. But when he hears this word extracted from the dictionary and speaks it into the computer, the child is then informed as to the meaning of this word by an image of a boat and how it is spelled.

In this way the child is encouraged to explore the entire electronic dictionary rather than only those words that come to mind when using the training system.

Alternatively, one may provide a dedicated computer in whose memory is stored the electronic dictionary and the library of digitized images to provide a self-sufficient and compact device for home use by a pre-school child or for use in an elementary school.

If in the first grade of an elementary school, the students are given a simple story book to read, the dedicated computer in its electronic dictionary can include all of the words in the book except for articles and prepositions. In this way a child who masters the spelling of the words in the electronic dictionary will experience no difficulty in reading the book.

The advantage of using the system to teach spelling to an individual child rather than having a teacher address a group of students in a class room, is that the system operates at a pace governed by the child using it. Thus the child can dwell as long as he wishes on the spelling of a particular word before he speaks another word into the computer.

While there have been shown and described preferred embodiments of a phonics training computer system for teaching spelling and reading in accordance with the invention, it will be appreciated that many changes and modifications may be made therein without, however, departing from the essential spirit thereof.

I claim:

1. A phonics training system adapted to teach a pre-school child having a limited vocabulary of words that identify various objects to spell these words and thereby be able to read; said system comprising:

A. a computer having an output terminal provided with a video screen;

B. an electronic dictionary associated with the computer in which is digitally stored the phonetic sounds of the words in the limited vocabulary of the pre-school child that identify objects and the letters of the alphabet that spell each word; said electronics dictionary being contained in software downloaded into the memory of the computer;

C. an image library associated with the computer in which is digitally stored images of said objects identified by the limited vocabulary; and D. means including a voice recognition unit in the input of said computer, the unit acting to recognize the distinctive sound pattern of the child speaking into the unit and to condition the phonetic dictionary to respond to this pattern, whereby when the child speaks into the unit a specific word included in the dictionary identifying a particular object, the output of the unit is digitized and the computer then acts to scan the dictionary to find the corresponding phonetic sounds digitally stored therein, and when a match is found to present on the screen the letters which spell the specific word and the image of the object identified thereby.

2. A system as set forth in claim 1, in which the library of images is contained in software downloaded in a memory.

3. A system as set forth in claim 1, further including means to select from the electronic dictionary a word digitally stored in the electronic dictionary and to reproduce this word so that it can be heard by the child, whereby the child can then speak this word into the recognition unit.

4. A system as set forth in claim 3, in which said means to select in a random access selector.

5. A system as set forth in claim 4, in which said random access selector is coupled to a digital to analog converter to convert the digitally stored word into an analog signal that is reproduced.

* * * * *